US012578958B2

(12) United States Patent
Koundinya et al.

(10) Patent No.: US 12,578,958 B2
(45) Date of Patent: Mar. 17, 2026

(54) IN SERVICE SOFTWARE UPDATES FOR STANDALONE NETWORK DEVICES

(71) Applicant: HEWLETT PACKARD ENTERPRISE DEVELOPMENT LP, Spring, TX (US)

(72) Inventors: Chivukula Koundinya, Bangalore (IN); Balaji Sankaran, Bangalore (IN); Sivakumar Murugan, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 189 days.

(21) Appl. No.: 18/412,044

(22) Filed: Jan. 12, 2024

(65) Prior Publication Data

US 2025/0138810 A1     May 1, 2025

(30) Foreign Application Priority Data

Nov. 1, 2023    (IN) .............................. 202341074414

(51) Int. Cl.
G06F 9/44          (2018.01)
G06F 8/656         (2018.01)
(52) U.S. Cl.
CPC .................................... G06F 8/656 (2018.02)
(58) Field of Classification Search
CPC ............................................... G06F 8/656
USPC ....................................................... 717/168
See application file for complete search history.

(56) References Cited

U.S. PATENT DOCUMENTS

| | | | | |
|---|---|---|---|---|
| 10,366,378 | B1 * | 7/2019 | Han ...................... | G06Q 20/204 |
| 10,936,333 | B2 * | 3/2021 | Mickelsson .............. | G06F 8/65 |
| 11,775,356 | B2 | 10/2023 | Rojas Fonseca et al. | |
| 2006/0271557 | A1 * | 11/2006 | Harward ................... | G06F 9/52 |
| 2023/0315437 | A1 * | 10/2023 | Kumar .................... | G06F 8/656 |
| | | | | 717/170 |

OTHER PUBLICATIONS

Allied Telesis, "How To Duplex configuration Use The In-Service Software Upgrade (ISSU) Feature ", C613-16185-00 Rev A, 2014, 23 Pages.

(Continued)

*Primary Examiner* — Evral E Bodden
(74) *Attorney, Agent, or Firm* — Hewlett Packard Enterprise Patent Department

(57)                    ABSTRACT

In certain embodiments, a method includes stopping platform daemons of a standalone network device; creating an ISSU cache; storing forwarding information in the ISSU cache to freeze the forwarding information; installing an updated state database; storing the forwarding information from the ISSU cache in the updated state database; generating a warm boot file for a line card daemon; installing an updated line card daemon; recovering an internal state of a line card to the updated line card daemon using the warm boot file; connecting the updated line card daemon to the updated state database; syncing the updated state database to a non-updated state database; unfreezing the forwarding information by allowing the updated line card daemon to update the forwarding information of the line card using information from the updated state database; updating control plane daemons of the standalone network device; and updating the platform daemons of the standalone network device.

20 Claims, 4 Drawing Sheets

(56)  References Cited

OTHER PUBLICATIONS

Arista, "Eos 4.34.2F User Manual", available online at <https://web.archive.org/web/20231128173859/https://www. arista.com/en/um-eos/eos-smart-system-upgrade#xx1135339>, Nov. 28, 2023, 13 pages.

Arista, "Hitless Upgrades - The Whats, The Whys, and The Hows", availale online at <https://arista.my.site.com/ AristaCommunity/s/article/Hitless-Upgrades-The-Whats-The-Whys-and-The-Hows>, Sep. 22, 2022, 12 pages.

Aruba, "Aruba Solution TME", Validated Solution Guide, Oct. 3, 2025, 127 Pages.

Arubhat, "xFSU on Catalyst 9300: The Always-On Access Network", Jan. 15, 2021, 7 pages.

Brocade, "Upgrading a stack with ISSU", available online at <https://docs. ruckuswireless.com/fastiron/08.0.60/ fastiron-08060-doc-library/GUID-EE644C1E-02AD-48A8-85C2-DEC2793FCA9B. html>, 2017, 3 pages.

Shyam Kota, "Tag STP", available online at <https://www.arista. com/en/support/toi/tag/stp>, Jun. 12, 2019, 5 pages.

Tech Field Day, "Arista Networks Leaf SSU Demo", available online at <https://www.youtube.com/watch? v=jkEiT4R7lhE>, Aug. 21, 2015, 2 pages.

* cited by examiner

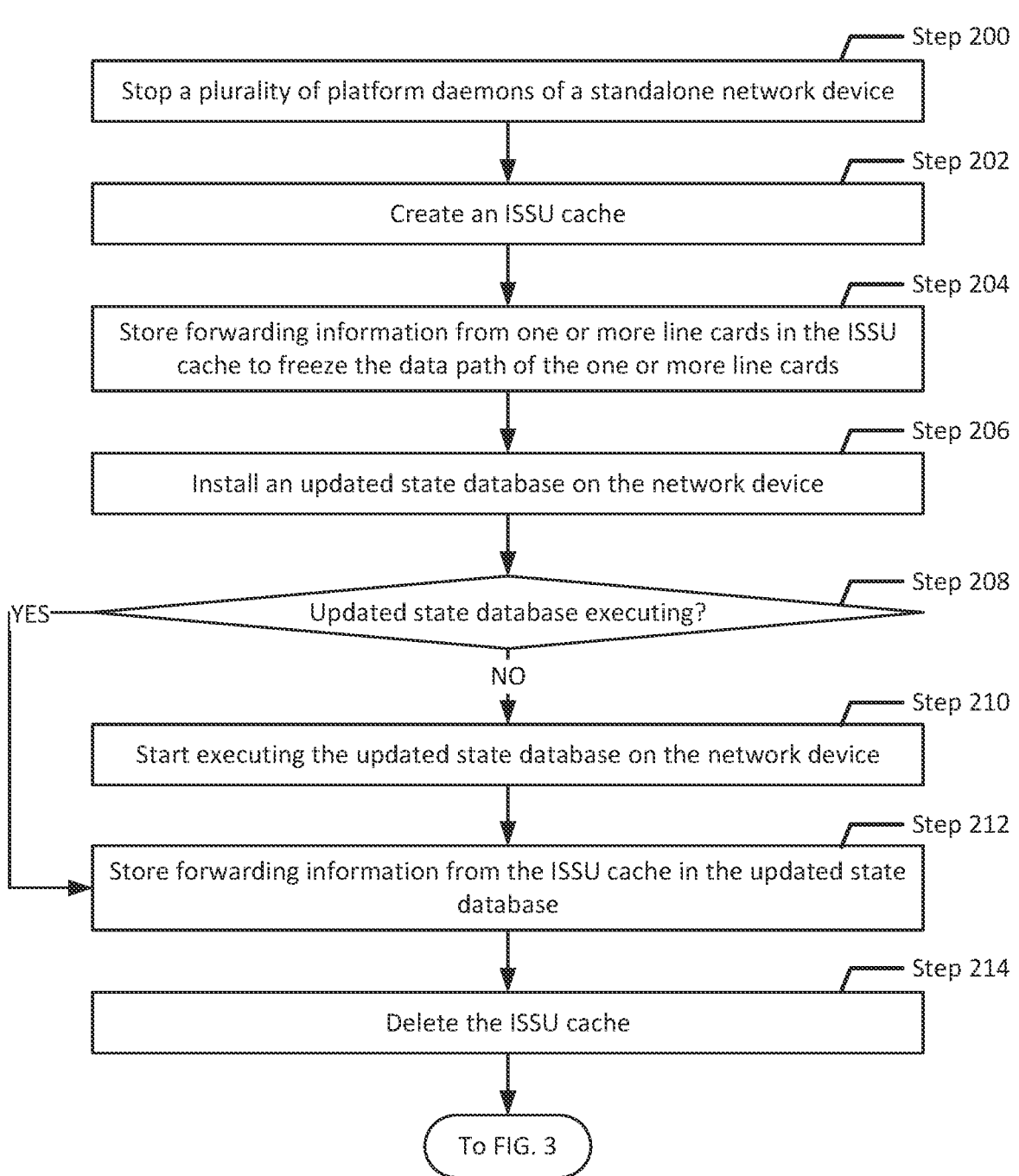

Step 200
Stop a plurality of platform daemons of a standalone network device

Step 202
Create an ISSU cache

Step 204
Store forwarding information from one or more line cards in the ISSU cache to freeze the data path of the one or more line cards Step 206
Install an updated state database on the network device Step 208
Updated state database executing?

YES

NO

Step 210
Start executing the updated state database on the network device

Step 212
Store forwarding information from the ISSU cache in the updated state database Step 214
Delete the ISSU cache To FIG. 3

FIG. 2

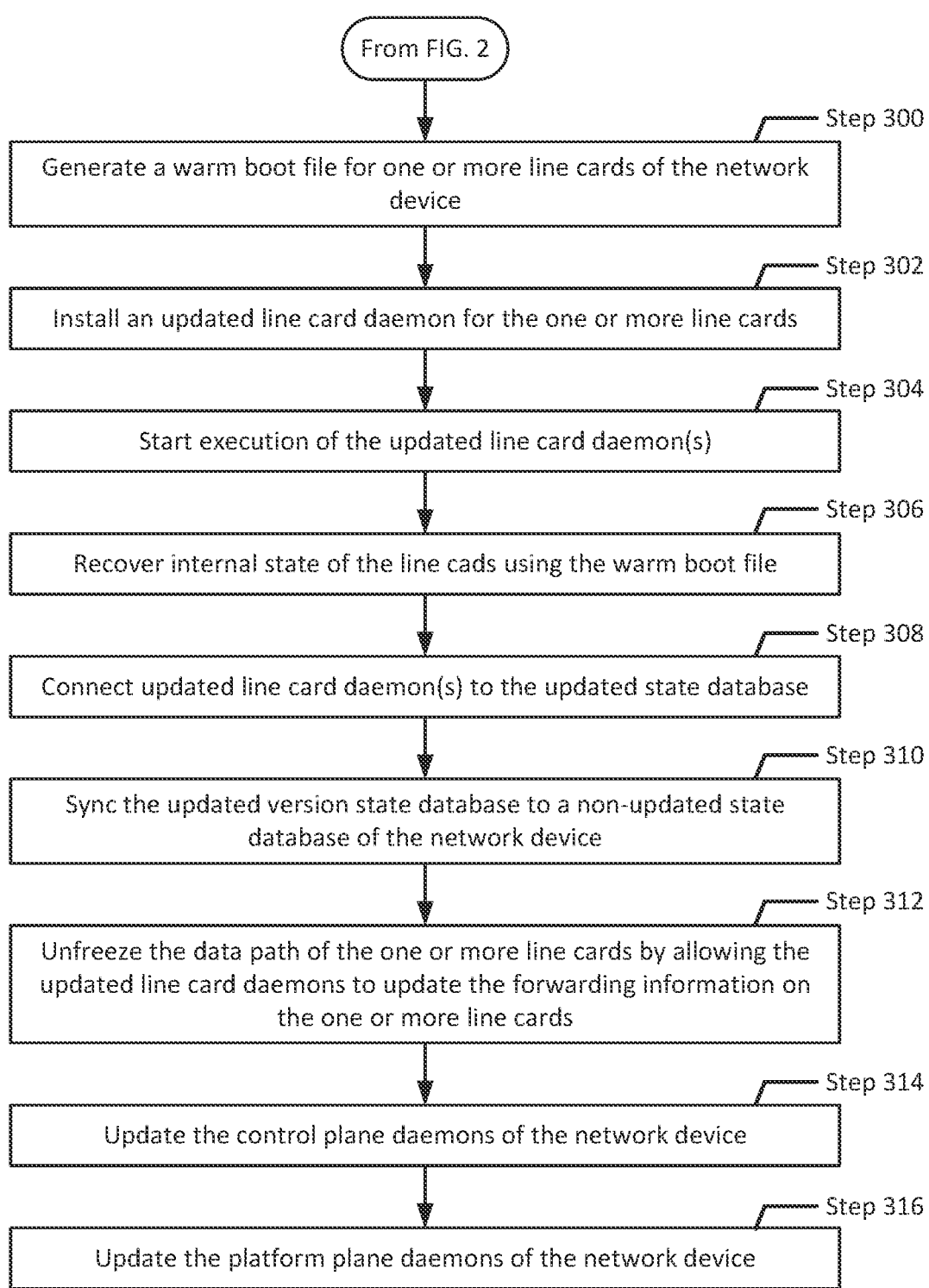

From FIG. 2

Step 300
Generate a warm boot file for one or more line cards of the network device Step 302
Install an updated line card daemon for the one or more line cards Step 304
Start execution of the updated line card daemon(s)

Step 306
Recover internal state of the line cads using the warm boot file

Step 308
Connect updated line card daemon(s) to the updated state database

Step 310
Sync the updated version state database to a non-updated state database of the network device Step 312
Unfreeze the data path of the one or more line cards by allowing the updated line card daemons to update the forwarding information on the one or more line cards Step 314
Update the control plane daemons of the network device Step 316
Update the platform plane daemons of the network device

FIG. 3

IN SERVICE SOFTWARE UPDATES FOR STANDALONE NETWORK DEVICES

BACKGROUND

From time to time, various software items installed on devices, such as network devices, may be updated. Such updates often cause disruption in the ability of the devices to continue operating as intended throughout the software update process.

BRIEF DESCRIPTION OF THE DRAWINGS

Certain embodiments discussed herein will be described with reference to the accompanying drawings listed below. However, the accompanying drawings illustrate only certain aspects or implementations of embodiments described herein by way of example, and are not meant to limit the scope of the claims.

FIG. 2 illustrates an overview of an example method for performing an in-service software update on a standalone network device in accordance with one or more embodiments disclosed herein;

FIG. 3 illustrates an overview of an example method for performing an in-service software update on a standalone network device in accordance with one or more embodiments disclosed herein.

DETAILED DESCRIPTION

Figure 1:
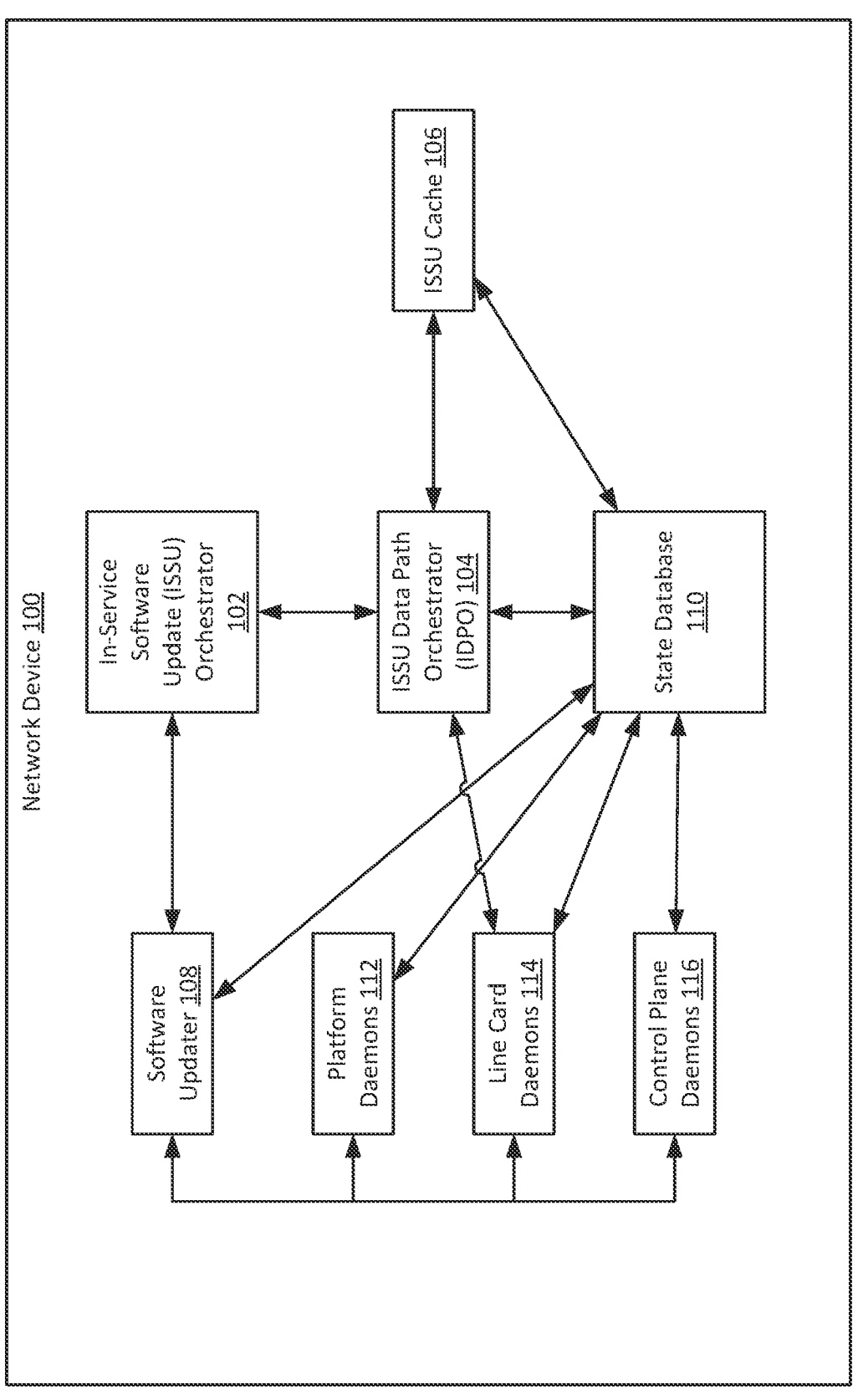
FIG. 1 illustrates a block diagram of an example system for implementing in-service software updates for standalone network devices in accordance with one or more embodiments disclosed herein.

Network devices may execute an operating system, as well as a variety of other software to perform the intended functionality of the network device. Such other software may include, for example, a database storing state information for the network device, and various other daemons, processes, threads, agents, etc., which may, for example, be implemented as any number of microservices running on the operating system of the network device. In this disclosure, all such software components may be referred to as daemons. Thus, as used herein, a daemon may refer to any software component executing on a network device, such as agents, services, processes, threads, etc. A daemon, as used herein, may refer to any other software component of a network device without departing from the scope of embodiments disclosed herein.

Such daemons, may include, but are not limited to, platform daemons for various network device components, such as, for example, fans, temperature components, Bluetooth components, Universal Serial Bus (USB) components, helper daemons, counter-related daemons, port-state daemons (e.g., daemons that monitor a link up or link down state), etc., all of which are useful to the operation of the network device, but are not necessarily critical to the network device processing of network traffic. Software executing on the network device may also include daemons for the line cards of the network device (e.g., line card daemons), which may be responsible, for example, for updating the hardware (e.g., Application Specific Integrated Circuits (ASICs), ternary content addressable memories (TCAMs)) of the line cards of a network device to include appropriate forwarding information (e.g., in hardware tables stored on the line card hardware) to allow the network device to process network traffic. Such information may be referred to as a Forwarding Information Base (FIB) or, more generally, forwarding information. Software executing on the network device may also include control plane daemons, such as daemons for various network protocols, such as Border Gateway Protocol (BGP), Open Shortest Path First (OSPF), Bidirectional Forwarding Detection (BFD), Virtual Router Redundancy Protocol (VRRP), Spanning Tree Protocol (STP), etc. Control plane daemons may operate in the control plane of the network device, and perform a variety of functions, such as updating a Routing Information Base (RIB) of the network device, from which the forwarding information used to update the line card hardware components is obtained by the aforementioned line card daemons to perform such updates, as needed.

From time to time, all or any portion of the software executing on a network device (e.g., the aforementioned database, various daemons, etc.) may be updated. One technique for updating such software components includes installing the new versions of any updated software components (e.g., from a software image that includes updates to various daemons, databases, etc.), and rebooting the network device, after which the new versions of the software components will execute. However, such a technique causes a disruption in the ability of the network device to process network traffic while the reboot is occurring.

Other techniques for performing software updates of network devices attempt to mitigate disruption of network traffic processing by using some form of redundancy. One such technique is to have multiple network devices (e.g., stacked network devices), one of which is an active device processing network traffic, while another serves as a standby device. In such a case, software updates may be performed, for example, by performing updates to the standby device, performing a failover from the active device to the standby device, and then updating the previously active device. Another technique is to have multiple modules in a network device that are similarly redundant in an active/standby setup, and use a similar technique to avoid traffic disruption. However, such techniques require additional hardware, and associated costs for such hardware, and thus may not be feasible or appropriate in all scenarios.

As an example, many use cases exist where a single network device with no extra redundant network device or redundant or extra module within the same network device is deployed, which may be referred to as a standalone network device. Such use cases include, but are not limited to: home or small business network deployments, which may rarely have redundancy of network devices or modules in network devices; deployments of basic access points in campus networks; or any deployment for which cost is a factor. In such use cases, performing software updates may adversely impact the ability of a standalone network device to process network traffic without disruption.

In order to address at least the aforementioned problems with performing software updates for standalone network devices, embodiments disclosed herein provide techniques for performing in-service software updates for standalone network devices, in a manner that may be referred to as hitless, meaning that there is little, if any, disruption to the ability of the network device to process network traffic during the software updates.

In one or more embodiments, to perform an in-service, hitless update of software on a standalone network device, the software update is performed in a series of phases, which may be orchestrated, for example, by an in-service software update (ISSU) orchestrator.

In one or more embodiments, the first phase, which may be referred to as phase zero, is a teardown phase in which actions are performed, at least in part, to free up memory of the standalone network device. Network devices may be memory limited, meaning that they may have finite amounts of memory and/or storage available for performing network device operations. Moreover, standalone network devices that use state databases may store all of the state of the network device in memory. As used herein, the term state refers to any information related to the operation of the standalone network device. State may be provided by any daemons of other software executing on the standalone network device. Examples of state information include, but are not limited to, routing information (e.g., as provided to a state database from various routing protocol daemons), status information (e.g., of various components of the standalone network device, such as fans, temperature monitors, ports, line cards, power units, etc.), software status information, etc. Therefore, to perform a hitless ISSU of a standalone network device, it may be useful to make more memory free during the process so that techniques disclosed herein may be performed.

As an example, embodiments disclosed herein may cause multiple versions of a state database, or portions thereof, of a network device, to exist at the same time, which requires additional memory space to facilitate. Thus, in one or more embodiments, phase zero may include stopping daemons that are not necessary for the network device to continue processing network traffic (e.g., packets, frames, etc.). Such daemons may be collectively referred to as platform daemons. Platform daemons may include, but are not limited to: daemons that monitor and/or control network device hardware components (e.g., fans, lights (e.g., LEDs), power supplies, temperature components, etc.); helper daemons; daemons that monitor and/or control various counters; daemons that monitor and/or control link states (e.g., port state daemons), daemons that monitor various statistics relevant to the network device, etc. Stopping execution of such platform daemons may free memory resources of the network device. Phase zero may further include executing one or more memory recovery functions (e.g., the Linux malloc_trim function) that cause unused memory to be relinquished from various software components of the network device, thereby reclaiming such unused memory, which may then be used during the ISSU process disclosed herein.

In one or more embodiments, after phase zero is complete, and the platform daemons are stopped, the next phase may be performed, which may be referred to as phase one. In one or more embodiments, phase one is a database migration phase. In one or more embodiments, the database migration phase includes installing a new version of a database on the standalone network device. In one or more embodiments, to facilitate installation of a new database, the data path on all line cards of the network device is frozen. In one or more embodiments, a line card is a hardware component of a network device, which may include a collection of hardware components such as physical interface ports, storage components (e.g., ASICs, TCAMs, etc.) for storing forwarding information and other information, and/or processing network traffic. A network device may include any number of line cards without departing from the scope of embodiments disclosed herein. In one or more embodiments, freezing the data path of the one or more line cards of a network device includes creating a snapshot of the data plane forwarding information of the one or more line cards. In one or more embodiments, the snapshot includes all forwarding information of the line cards that allows the line cards to process network traffic, such as route information, media access control (MAC) address table information, etc.

In one or more embodiments, the snapshot is stored in an ISSU cache created for the hitless ISSU process. The ISSU cache may be stored in any memory and/or storage of the network device. In one or more embodiments, the forwarding information of the line cards (e.g., the forwarding information stored in various hardware components of the line cards) does not change until later in the ISSU process, after the software updates have been performed, and the line cards may use the forwarding information to continue to process network traffic.

In one or more embodiments, phase one also includes the ISSU orchestrator making a request to a software updater to install a new state database version. In one or more embodiments, the software updater is a process that has access to a new network device software image that includes updates to all or any portion of the software of the network device, including the state database and the various daemons.

In one or more embodiments, a state database of a network device is a database that includes state information from the various daemons (e.g., platform daemons, control plan daemons, line card daemons, etc.) executing on the network device, and includes information such as the RIB information. In one or more embodiments, as described above, state information is any information related to the operation of the standalone network device, including any components, software, etc. therein. The state database may be updated on an on-going basis by the various daemons of the network device as the state of the network device changes or is otherwise updated. As an example, as new routing information is learned by the various routing protocol daemons of the control plane of the network device, the routing information may be used to update the state database (e.g., by adding, modifying, deleting, etc. routes from the RIB of the state database).

In one or more embodiments, in response to receiving the request from the ISSU orchestrator to update the database of the network device, the software updater may extract the new state database version from the network device software image, and install the updated state database on the network device. Thus, in one or more embodiments, at this point in the ISSU process, the network device may have, in memory of the network device, the previous version of the state database, which is still being updated as the state of the network device changes, as well as a new version of the state database.

In one or more embodiments, after the new version of the state database is installed by the software updater, execution of the new state database begins. In one or more embodiments, once the new version of the state database is executing, the forwarding information that was previously stored in the ISSU cache is added to the new version of the database, and the ISSU cache is stopped or deleted, thereby making the resources used for the ISSU cache available for the remainder of the ISSU process.

In one or more embodiments, after the ISSU cache is stopped and/or deleted, the ISSU process begins a phase two. In one or more embodiments, phase two includes performing an update of the line card daemons of the network device. In one or more embodiments, a line card daemon is configured to manage one or more line cards of the network device. Managing the one or more line cards may include, for example, obtaining routing information from the RIB and updating the various data structures of the line cards to include appropriate forwarding information (e.g., MAC tables, route table entries, multicast forwarding entries, etc.) to allow the network device to process network traffic.

In one or more embodiments, such updates require the line card daemons to have information about where in the memory and/or storage of the line cards such information is to be placed (e.g., TCAM index information), what information has been placed in such locations, etc., which may be referred to as the internal state of the line cards. In one or more embodiments, the internal state of the line cards maintained by the line card daemons is put into a warm boot file for each line card daemon. In one or more embodiments, a warm boot file is a file for a line card daemon that the line card daemon can use after restarting to recover the internal state of the line card as it existed before the line card daemon was restarted (e.g., after being updated, as discussed herein).

In one or more embodiments, after the one or more warm boot files are created for the one or more line card daemons of the network device, the ISSU orchestrator request that the software updater install updated versions of the line card daemons. In one or more embodiments, after the installation is complete, the updated line card daemons are started and provided respective warm boot files as input, thereby recovering the internal state of the respective line cards of the one or more line card daemons. In one or more embodiments, the line card daemons are further instructed to connect to the new version of the state database, which has the forwarding information that was placed into the new version of the state database from the now-deleted ISSU cache, which was a snapshot of the forwarding information of the line cards taken before the new version of the state database was installed. During this time, the network device continues to process network traffic according to the forwarding information of which the aforementioned snapshot was taken, which, as discussed above, may be referred to as freezing the data paths used to process network traffic. In one or more embodiments, at this point in the ISSU process, the updated line card daemons are executing and connected to the new version of the database.

In one or more embodiments, the ISSU orchestrator next causes the new version of the state database to begin syncing with the old version of the state database. In one or more embodiments, as discussed above, the old version of the state database is still being updated by the various daemons (e.g., control plane daemons) with state updates for the network device. Thus, in one or more embodiments, syncing the new version of the state database to the old version of the state database causes the new version of the state database to have the updated state of the network device, including the routing information from the various routing protocol daemons. The updated line card daemons may resume updating the forwarding information of the line cards using the updated state information now in the new version of the state database, which may be referred to as unfreezing the data paths used by the network device to process network traffic. In one or more embodiments, the line card daemons are able to resume programing the forwarding information to the line cards based, at least in part, on the internal state information of the warm boot file that was used after the restart of each updated line card daemon, and the updated state information in the new state database.

In one or more embodiments, after the data paths are unfrozen, and the line card daemons have connected to the new version of the state database and resumed updating the line cards with relevant information from the new state database, a phase three of the ISSU process begins. In one or more embodiments, phase three includes updating the rest of the daemons of the network device, including the control plane daemons and the platform daemons. In one or more embodiments, updating the remaining daemons is performed by first updating the control plane daemons that are more critical to operation of the network device, and then updating daemons that are less critical, such as the platform daemons.

In one or more embodiments, the more critical daemons updated during phase three include, but are not limited to: routing protocol daemons, such as daemons for BGP, OSPF, intermediate system-to-intermediate system (IS-IS), routing information protocol (RIP); and other daemons for various features implemented on a network device, such as STP, VRRP, BFD, Virtual extensible local area network (VXLAN), link aggregation group (LAG), multiprotocol label switching (MPLS), generic routing encapsulation (GRE), virtual private network (VPN), etc. Other control plane daemons may be considered as more critical daemons without departing from the scope of embodiments disclosed herein. In one or more embodiments, the ISSU orchestrator requests the software updater to install the new versions of the control plane daemons. In one or more embodiments, once the new versions are installed, the daemons are restarted and connected to the new version of the database. Thus, at this point in the ISSU process, the more critical control plane daemons are directly updating the new version of the database. In one or more embodiments, the update of the more critical control plane daemons occurs in an amount of time in the sub-second range, thereby rendering the update relatively hitless with respect to the control plane of the network device.

In one or more embodiments, after the update of the more critical control plane daemons is complete, the ISSU orchestrator requests the software updater to update the remaining daemons of the network device, such as the platform daemons (e.g., daemons controlling or otherwise managing fans, Bluetooth, USB, temperature components, helper components, counter components, port-state, etc.). In one or more embodiments, as each daemon is updated and restarted, the updated version of the daemon is connected to the new version of the database.

In one or more embodiments, once all of the daemons of the network device are updated, as described above, the old version of the state database is stopped, and may be discarded. At this point in the ISSU process, the state database and all daemons of the network device, including the control plane daemons, have been updated, all without impacting the data plane and forwarding operation of the network device.

Certain embodiments of this disclosure may allow standalone network devices to have software updates performed while the network device remains in service and processing network traffic, and the updates are performed without requiring the redundancy (e.g., of other network devices, dual modules in a network device, etc.) that may be used in other techniques for updating network device software.

FIG. 1 illustrates a block diagram of an example system for implementing in-service software updates for standalone network devices in accordance with one or more embodiments disclosed herein. The system may include a network device 100. The network device 100 may include an ISSU orchestrator 102, an ISSU data path orchestrator (IDPO) 104, an ISSU cache 106, a software updater 108, a state database 110, platform daemons 112, line card daemons 114, and control plane daemons 116. Each of these components is described below.

In one or more embodiments, the network device 100 is a standalone network device. In one or more embodiments, as discussed above, a standalone network device is any network device that lacks redundancy that would allow for the network device to be updated, rebooted, etc. without impacting the processing of network traffic. Such redundancy, for non-standalone network devices may be implemented, for example, by having two or more network devices being configured as stacked network devices, by having a network device include two or more modules (e.g., in a modular network device) that are each capable of processing network traffic separately, or any other configuration that provides redundancy of network traffic processing capability. In one or more embodiments, a standalone network device lacks such redundancy. Examples of standalone network devices include, but are not limited to, network devices near the edge of a network (e.g., home or small business network devices), access points in campus network deployments, standalone top-or-rack devices in larger network deployments (e.g., datacenters, portions thereof, etc.).

In one or more embodiments, the network device 100 is a device that includes and/or is operatively connected to persistent storage (not shown), memory (e.g., random access memory (RAM)) (not shown), one or more processor(s) (e.g., integrated circuits) (not shown), and at least one physical network interface (not shown), which may also be referred to as a port, and which may provide connections (i.e., links) to other devices (e.g., computing devices, other network devices, etc.).

In one or more embodiments, the network device 100 also includes any number of additional components (not shown), such as, for example, network chips, field programmable gate arrays (FPGAs), application specific integrated circuits (ASICs), indicator lights (not shown), fans (not shown), power supply units, power distribution units, etc. At least a portion of such hardware components may be included as part of one or more line cards of the network device 100. In one or more embodiments, a line card, as used herein, refers to a collection of hardware components (e.g., connected by a printed circuit board) that include one or more physical interface (e.g., network ports) and any number of additional hardware components (e.g., ASICs, FPGAs, TCAMs, processor components, other memory components, etc.) that are used, at least in part, to store forwarding information and process network traffic. Forwarding information (which may include all or any portion of information that may be referred to as the 'FIB') may, for example, be stored (e.g., in various tables) in one or more hardware components of the line cards, such as MAC tables, route table entries, multicast forwarding entries, etc. The network device 100 may include any number of line cards, and each line card may include any number of physical interfaces. The network device 100 may include any other components without departing from the scope of embodiments described herein.

In one or more embodiments, as discussed above, the network device 100 includes at least one physical interface (and often two or more such physical interfaces). In one or more embodiments, physical interfaces are any hardware, software, or combination thereof that include functionality to receive and/or transmit network traffic data units (e.g., packets, frames, etc.) or any other information to or from the network device 100. Physical interfaces may include any interface technology, such as, for example, optical, electrical, etc. Physical interfaces may be configured to interface with any transmission medium (e.g., optical fiber, copper wire(s), etc.).

In one or more embodiments, physical interfaces include and/or are operatively connected to any number of components used in the processing of network traffic. For example, a given physical interface may include a PHY (not shown), which is circuitry that connects a physical information propagation medium (e.g., a wire) to other components (e.g., the hardware components of a line card), which process the network traffic. In one or more embodiments, physical interfaces include and/or are operatively connected to a transceiver, which provides the connection between the physical information transmission medium and the PHY. A PHY may also include any number of other components, such as, for example a serializer/deserializer (SERDES), and encoder/decoder, etc. A PHY may, in turn, be operatively connected to other any number of other components, such as, for example, a media access control (MAC) sublayer. Such a sublayer, may, in turn, be operatively connected to still other higher layer processing components, all of which form a series of components used in the processing of network traffic being received, transmitted, or otherwise used by the network device 100 for any purpose (e.g., network device management).

In one or more embodiments, the network device 100 includes any software (e.g., various daemons, a state database, etc.) configured to perform various functions of the network device (e.g., to process network traffic). Such software may, for example, execute using one or more processors of a network device, or any other hardware resource of a network device capable of executing software.

Examples of a network device, such as the network device 100, include, but are not limited to, a switch, a router, a multilayer switch, a fibre channel device, an InfiniBand® device, etc. A network device is not limited to the aforementioned specific examples.

In one or more embodiments, the network device 100 includes functionality to receive network traffic (e.g., frames, packets, tunneling protocol frames, etc.) at any of the physical interfaces (i.e., ports) of the network device 100, and to process the network traffic. In one or more embodiments, processing a network traffic includes, but is not limited to, a series of one or more lookups (e.g., longest prefix match (LPM) lookups, forwarding equivalence class (FEC) lookups, etc.) and corresponding actions (e.g., forward from a certain egress port, add a labeling protocol header, rewrite a destination address, encapsulate, etc.). Examples of network traffic processing include, but are not limited to, determining: (i) whether to take a security action (e.g., drop the network traffic data unit); (ii) whether to mirror the network traffic data unit; and/or (iii) how to route/forward the network traffic data unit in order to transmit the network traffic data unit from an interface of the network device 100.

In one or more embodiments, the network device 100 is part of a network (not shown). A network may refer to an entire network or any portion thereof (e.g., a logical portion of the devices within a topology of devices). A network may include a datacenter network, a wide area network, a local area network, a wireless network, a cellular phone network, or any other suitable network that facilitates the exchange of information from one part of the network to another. In one or more embodiments, a network may be coupled with or overlap, at least in part, with the Internet. In one or more embodiments, a network includes a collection of one or more devices (e.g., network devices, computing devices, etc.) that facilitate network connectivity for one or more operatively connected devices (e.g., computing devices, data storage devices, other network devices, etc.) (not shown). In one or more embodiments, a network device and other devices within the network are arranged in a network topology (not shown). In one or more embodiments, a network topology is an arrangement of various devices of a network.

In one or more embodiments, the persistent storage and/or memory (not shown) of the network device 100 may be or include one or more data repositories for storing any number of data structures storing any amount of data (i.e., information). In one or more embodiments, a data repository is any type of storage unit and/or device (e.g., a file system, database, collection of tables, RAM, and/or any other storage mechanism) for storing data. Further, the data repository may include multiple different storage units and/or devices. The multiple different storage units and/or devices may or may not be of the same type or located at the same physical location.

In one or more embodiments, the persistent storage and/or memory of network device (100) may be considered, in whole or in part, as non-transitory computer readable mediums storing, at least in part, software and/or firmware.

Such software and/or firmware may include instructions which, when executed by the one or more processors (not shown) or other hardware (e.g. circuitry) of the network device 100, cause the one or more processors and/or other hardware components to perform operations in accordance with one or more embodiments described herein.

Such software instructions may be in the form of computer readable program code to perform methods of embodiments as disclosed herein, and may, as an example, be stored, in whole or in part, temporarily or permanently, on a non-transitory computer readable medium such as a compact disc (CD), digital versatile disc (DVD), storage device, diskette, tape, flash memory, physical memory, or any other non-transitory computer readable medium.

Although certain embodiments disclosed herein are discussed in terms of a network device (e.g., the network device 100), embodiments may be implemented on any computing device (not shown) configured to process network traffic. In one or more embodiments, as used herein, a computing device may be any single computing device, a set of computing devices, one or more portion(s) of one or more computing devices, or any other physical, virtual, and/or logical grouping of computing resources. In one or more embodiments, a computing device is any device, portion of a device, or any set of devices capable of electronically processing instructions and may include, but is not limited to, any of the following: one or more processors (e.g., components that include circuitry) (not shown), memory (e.g., random access memory (RAM)) (not shown), input and output device(s) (not shown), non-volatile storage hardware (e.g., solid-state drives (SSDs), hard disk drives (HDDs) (not shown)), one or more physical interfaces (e.g., network ports, storage ports) (not shown), any number of other hardware components (not shown), and/or any combination thereof.

Examples of computing devices include, but are not limited to, a server (e.g., a blade-server in a blade-server chassis, a rack server in a rack, etc.), a desktop computer, a mobile device (e.g., laptop computer, smart phone, personal digital assistant, tablet computer, automobile computing system, and/or any other mobile computing device), a storage device (e.g., a disk drive array, a fibre channel storage device, an Internet Small Computer Systems Interface (ISCSI) storage device, a tape storage device, a flash storage array, a network attached storage device, etc.), a network device (e.g., switch, router, multi-layer switch, etc., such as the network device 100), a virtual machine, a virtualized computing environment, a logical container (e.g., for one or more applications), an Internet of Things (IoT) device, an array of nodes of computing resources, a supercomputing device, a data center or any portion thereof, a digital sensor, and/or any other type of computing device with the aforementioned requirements. In one or more embodiments, any or all of the aforementioned examples may be combined to create a system of such devices, or may be partitioned into separate logical devices, which may collectively be referred to as a computing device. Other types of computing devices may be used without departing from the scope of embodiments described herein, such as, for example, the computing device shown in FIG. 4 and described below.

In one or more embodiments, the storage (not shown) and/or memory (not shown) of a computing device or system of computing devices may be and/or include one or more data repositories for storing any number of data structures storing any amount of data (e.g., information).

In one or more embodiments, any storage (not shown) and/or memory (not shown) of a computing device or system of computing devices may be considered, in whole or in part, as non-transitory computer readable mediums storing software and/or firmware.

Such software and/or firmware may include instructions which, when executed by the one or more processors (not shown) and/or other hardware (e.g. circuitry) of a computing device and/or system of computing devices, cause the one or more processors and/or other hardware components to perform operations in accordance with one or more embodiments described herein.

The software instructions may be in the form of computer readable program code to perform methods, processes, etc. of embodiments as described herein, and may, as an example, be stored, in whole or in part, temporarily or permanently, on a non-transitory computer readable medium such as a compact disc (CD), digital versatile disc (DVD), storage device, diskette, tape storage, flash storage, physical memory, or any other non-transitory computer readable medium.

In one or more embodiments, the network device 100 includes any number of daemons (e.g., platform daemons, control plane daemons, line card daemons, etc.). As discussed above, as used herein, a daemon refers to any software component executing on a network device, such as agents, services, processes, threads, etc. A daemon, as used herein, may refer to any other software component of a network device without departing from the scope of embodiments disclosed herein.

In one or more embodiments, the network device 100 includes any number of platform daemons 112. The platform daemons 112 may monitor, control, or otherwise manage various components of the network device 100. The platform daemons 112 may include, but are not limited to, daemons for various network device components, such as, for example, fans, temperature components, Bluetooth components, Universal Serial Bus (USB) components, power components, helper daemons, counter-related daemons (e.g., daemons that update and/or monitor counters of the network device 100), port-state daemons (e.g., daemons that monitor a link up or link down state), etc., all of which are useful to the operation of the network device, but are not necessarily critical to the network device 100 when processing network traffic. The network device 100 may include other platform daemons without departing from the scope of embodiments disclosed herein. The network device 100 may include any number of platform daemons 112 without departing from the scope of embodiments disclosed herein.

In one or more embodiments, the network device 100 includes any number of line card daemons 114. In one or more embodiments, the line card daemons 114 configured to manage one or more line cards of the network device. In one or more embodiments, a line card daemon 114 is a daemon responsible, for example, for updating the hardware (e.g., Application Specific Integrated Circuits (ASICs), ternary content addressable memories (TCAMs), other hardware components, etc.) of the line cards of the network device 100 to include appropriate forwarding information (e.g., in hardware tables stored on the line card hardware) to allow the network device 100 to process network traffic. In one or more embodiments, the line card daemons 114 manage the internal state of the one or more line cards of the network device 100. Managing the one or more line cards may include, for example, obtaining routing information from the RIB and updating the various data structures of the line cards to include appropriate forwarding information (e.g., MAC tables, route table entries, multicast forwarding entries, etc.) to allow the network device to process network traffic. Maintaining the internal state of the one or more line cards may include managing information about the various data structures of the line cards, such as, for example, indexes, pointers, etc. of various tables implemented in various hardware components of the line cards. The network device 100 may include any number of line card daemons 114 without departing from the scope of embodiments disclosed herein.

In one or more embodiments, the network device 100 includes the control plane daemons 116. In one or more embodiments, the control plane daemons 116 are daemons executing in a control plane of the network device 100, and perform a variety of functions, such as, for example, updating a Routing Information Base (RIB) of the network device, from which the forwarding information used to update the line card hardware components is obtained by the aforementioned line card daemons to perform such updates, as needed. In one or more embodiments, the control plane daemons 116 include daemons that are relatively more critical than the platform daemons 112 in regards to allowing the network device 100 to correctly process network traffic. The control plane daemons may include routing protocol daemons, such as daemons for BGP, OSPF, intermediate system-to-intermediate system (IS-IS), routing information protocol (RIP); and other daemons for various features implemented on a network device, such as STP, VRRP, BFD, Virtual extensible local area network (VXLAN), link aggregation group (LAG), multiprotocol label switching (MPLS), generic routing encapsulation (GRE), virtual private network (VPN), etc. The network device 100 may include any other control plane daemons without departing from the scope of embodiments disclosed herein. The network device 100 may include any number of control plane daemons 116 without departing from the scope of embodiments disclosed herein.

In one or more embodiments, the network device 100 includes the state database 110. In one or more embodiments, the state database 110 of the network device 100 is a database that includes state information from the various daemons (e.g., platform daemons 112, control plane daemons 116, line card daemons 114, etc.) executing on the network device and operatively connected to the state database 110, and includes information such as the RIB information, information about the various components (fans, power, storage, ports, indicator lights, etc.) of the network device, link state information, etc. The state database 110 may be updated on an on-going basis by the various daemons of the network device as the state of the network device 100 changes or is otherwise updated. As an example, as new routing information is learned by the various routing protocol daemons of the control plane of the network device 100, the routing information may be used to update the state database 110 (e.g., by adding, modifying, deleting, etc. routes from the RIB of the state database 110).

In one or more embodiments, the network device 100 includes an ISSU orchestrator 102. The ISSU orchestrator 102 may be any hardware (e.g., circuitry), software, firmware, or any combination thereof that is configured to orchestrate an ISSU process. In one or more embodiments, an ISSU process is a technique for performing software updates on a standalone network device (e.g., the network device 100) in a hitless manner while the network device 100 continues to process network traffic.

In one or more embodiments, the ISSU orchestrator 102 is configured to interact with and/or otherwise direct other components of the network device 100 (e.g., the IDPO 104, the software updater 108) to perform various actions of the ISSU process (e.g., freezing and unfreezing the data path of line cards, obtain and install state database updates and daemon updates, initiate syncing between a previous state database version and an updated state database version, connect updated daemons to an updated database version, delete an ISSU cache, delete a previous version of a state database, etc.). Although FIG. 1 shows a single ISSU orchestrator 102, the network device 100 may include any number of ISSU orchestrators without departing from the scope of embodiments disclosed herein. Various functionality related to the ISSU orchestrator is discussed further in the description of FIG. 2 and FIG. 3, below In one or more embodiments, the network device 100 includes the IDPO 104. The IDPO 104 may be any hardware (e.g., circuitry), software, firmware, or any combination thereof that is configured to perform various actions related to the data path of network traffic in the network device 100. In one or more embodiments, a data path is all or any portion of a path through which network traffic traverses in the network device 100. In one or more embodiments, the data path includes, but is not limited to, the various stages of processing that occur in the one or more line cards of the network device. In one or more embodiments, the IDPO 104 is operatively connected to the ISSU orchestrator 102, and configured, at the direction of the ISSU orchestrator 102, to freeze and/or unfreeze the data path on line cards of the network device 100. In one or more embodiments, freezing the data path of the one or more line cards of a network device includes creating a snapshot of the data plane forwarding information of the one or more line cards. In one or more embodiments, the snapshot includes forwarding information of the line cards that allows the line cards to process network traffic, such as route information, media access control (MAC) address table information, etc.

In one or more embodiments, the IDPO 104 is configured to create or otherwise instantiate the ISSU cache 106. In one or more embodiments, the ISSU cache 106 is a data structure stored in any memory and/or storage of the network device 100. In one or more embodiments, the IDPO 104 is configured to store the snapshot of the data path of the one or more line cards of the network device 100 in the ISSU cache 106. In one or more embodiments, freezing the data path also refers to the fact that the forwarding information of the line cards (e.g., the forwarding information used to create the snapshot and that is stored in the ISSU cache 106) remains unchanged until later in the ISSU process, thereby allowing the line cards, and thus the network device 100, to continue processing network traffic throughout the ISSU process. In one or more embodiments, unfreezing the data path refers to the point later in the ISSU process when the forwarding information is allowed to be updated (e.g., after an update of the line card daemons and when the line card daemons begin to use information from an updated state database to update the forwarding information of the line cards). In one or more embodiments, the snapshot stored in the ISSU cache 106 includes all of the forwarding information of the one or more line cards of the network device. Alternatively, in one or more embodiments, only a portion of the forwarding information necessary for processing network traffic is used to create the snapshot stored in the ISSU cache 106.

In one or more embodiments, the IDPO 104 is configured to instruct one or more line card daemons of the network device 100 to create a warm boot file before being updated. In one or more embodiments, the internal state of the line cards maintained by the line card daemons is put into a warm boot file for each line card daemon. In one or more embodiments, a warm boot file is a file for a line card daemon (e.g., the line card daemons 114) that the line card daemon can use after restarting to recover the internal state of the line card as it existed before the line card daemon was restarted (e.g., after being updated, as discussed herein).

In one or more embodiments, the network device 100 includes the software updater 108. The software updater 108 may be any hardware (e.g., circuitry), software, firmware, or any combination thereof that is configured to perform software updates on the network device 100. In one or more embodiments, the software updater 108 has access to software updates for all or any portion of the software of the network device 100 (e.g., the state database 110, the platform daemons 112, the control plane daemons 116, the line card daemons 114, etc.). As an example, a software update image may be made available to the software updater 108 (e.g., over a network connection, from a software repository, from a USB device inserted into a USB port of the network device, etc.). In one or more embodiments, the software updater 108 is configured to obtain software updates (e.g., from a software update image) as directed by the ISSU orchestrator 102, and install the updates at the appropriate times during the ISSU process disclosed herein. Although FIG. 1 shows the network device 100 as including only one software updater 108, the network device 100 may include any number of software updaters without departing from the scope of embodiments disclosed herein.

While FIG. 1 shows a particular configuration of components, other configurations may be used without departing from the scope of embodiments described herein. For example, although FIG. 1 shows certain components as part of the same device, any of the components may be grouped in sets of one or more components which may exist and execute as part of any number of separate and operatively connected devices. As another example, a single component may be configured to perform all or any portion of the functionality performed by the components shown in FIG. 1. Accordingly, embodiments disclosed herein should not be limited to the configuration of components shown in FIG. 1.

FIG. 2 illustrates an overview of an example method for performing an in-service software update on a standalone network device in accordance with one or more embodiments disclosed herein. All or any portion of the method shown in FIG. 2 may be performed, for example, by a network device (e.g., the network device 100 shown in FIG. 1), and/or any components therein (e.g., the ISSU orchestrator 102, the IDPO 104, and/or the software updater 108 shown in FIG. 1). Additionally, or alternatively, all or any portion of the method shown in FIG. 2 may be performed, for example, by a computing device (e.g., the computing device 400 shown in FIG. 4) configured, at least in part, to serve as a network device by processing network traffic.

While the various steps in the flowchart shown in FIG. 2 are presented and described sequentially, some or all of the steps may be executed in different orders, some or all of the steps may be combined or omitted, other steps not shown in FIG. 2 may additionally be performed, and/or some or all of the steps may be executed in parallel with other steps of FIG. 2 and/or FIG. 3.

In Step 200, the method includes stopping a plurality of platform daemons of a standalone network device. In one or more embodiments, the platform daemons are stopped by an ISSU orchestrator (e.g., the ISSU orchestrator 102 shown in FIG. 1 and described above) of a standalone network device (e.g., the network device 100 shown in FIG. 1 and described above). In one or more embodiments, platform daemons, when executing, consume memory resources of a network device. Network devices may be memory limited, meaning that they may have finite amounts of memory and/or storage available for performing network device operations. Moreover, standalone network devices that use state databases may store all of the state of the network device in memory. Therefore, to perform a hitless ISSU process on a standalone network device, it may be useful to make more memory free during the process so that techniques disclosed herein may be performed without impacting network traffic processing operations of the standalone network device.

As an example, embodiments disclosed herein may cause multiple versions of a state database, or portions thereof, of a standalone network device, to exist at the same time, which requires additional memory space to facilitate. Thus, in one or more embodiments, the beginning of the ISSU process includes stopping daemons that are not necessary for the network device to continue processing network traffic (e.g., packets, frames, etc.), thereby stopping such daemons from using memory resources of the standalone network device. Such daemons may be collectively referred to as platform daemons. Platform daemons may include, but are not limited to: daemons that monitor and/or control network device hardware components (e.g., fans, lights (e.g., LEDs), power supplies, temperature components, etc.); helper daemons; daemons that monitor and/or control various counters; daemons that monitor and/or control link states (e.g., port state daemons), daemons that monitor various statistics relevant to the network device, etc. Stopping execution of such platform daemons may free memory resources of the network device. In one or more embodiments, in addition to stopping the platform daemons, the ISSU process at this point may further include executing one or more memory recovery functions (e.g., the Linux malloc_trim function) that cause unused memory to be relinquished from various software components of the network device, thereby reclaiming such unused memory, which may then be used during the ISSU process disclosed herein.

In Step 202, the method includes creating an ISSU cache (e.g., the ISSU cache 106 shown in FIG. 1 and described above). As an example, the ISSU cache may be created via an ISSU orchestrator (e.g., the ISSU orchestrator 102 of FIG. 1) directing an IDPO (e.g., the IDPO 104 shown in FIG. 1 and described above) to create the ISSU cache. The ISSU cache may be created in any storage and/or memory resources of a standalone network device. In one or more embodiments, the ISSU cache is created after the stopping of platform daemons, and optional execution of a memory reclamation function performed in Step 200, so that the standalone network device will have an appropriate amount of memory resources to support creation of the ISSU cache.

In Step 204, the method includes storing forwarding information from one or more line cards in the ISSU cache to freeze the data path of the one or more line cards. As an example, the storing of forwarding information in the ISSU cache may be performed via an ISSU orchestrator (e.g., the ISSU orchestrator 102 of FIG. 1) directing an IDPO (e.g., the IDPO 104 of FIG. 1) to store the forwarding information in the ISSU cache. In one or more embodiments, storing the forwarding information in the ISSU cache includes taking a snapshot of the forwarding information of one or more line cards of the standalone network device. In one or more embodiments, the snapshot includes all or any portion of the forwarding information of the line cards that allows the line cards to process network traffic, such as route information, media access control (MAC) address table information, etc. In one or more embodiments, the content of the snapshot is stored in the ISSU cache. In one or more embodiments, the forwarding information of the line cards (e.g., the forwarding information stored in various hardware components of the line cards that is used to create the snapshot) does not change until later in the ISSU process, after the software updates have been performed, and the line cards may use the forwarding information to continue to process network traffic during the ISSU process.

In Step 206, the method includes installing an updated state database on the standalone network device. As an example, the installation of the updated state database may be performed by an ISSU orchestrator requesting that a software updater (e.g., the software updater 108 shown in FIG. 1 and described above) install the updated state database. In one or more embodiments, installing the updated state database includes obtaining installation files (e.g., binaries) from a software update image for the standalone network device. The software update image may be accessed using any technique for accessing data, such as, for example, over a network from a software repository, from local storage of the standalone network device where the software update image was downloaded, from a removable storage device, etc. In one or more embodiments, the installation files (e.g., binaries) for the updated state database are extracted from the software update image, and installed on the standalone network device.

In Step 208, the method includes making a determination as to whether the updated state database is executing. The installation process for the updated state database may or may not include starting execution of the updated state database on the standalone network device. In one or more embodiments, if the updated state database is not executing, the method proceeds to Step 210. In one or more embodiments, if the updated state database is executing, the method proceeds to Step 212.

In Step 210, the method includes starting execution of the updated state database on the standalone network device. As an example, an ISSU orchestrator may initiate execution of the updated state database. In one or more embodiments, once the updated state database is executing, the updated state database is in a condition of being ready to accept information being added to the updated state database. In one or more embodiments, at this point in the ISSU process, the standalone network device includes the previous version of the state database, which is still being updated with various items of state information (e.g., from line card daemons and control plane daemons, but not platform daemons, which are stopped), as well as an empty updated state database and the ISSU cache that includes the snapshot of the frozen data path of the line cards of the standalone network device.

In Step 212, the method includes storing forwarding information from the ISSU cache in the updated state database. As an example, either the ISSU orchestrator, or the IDPO at the direction of the ISSU orchestrator, may initiate a transfer of the forwarding information of the snapshot in the ISSU cache to appropriate locations in the updated state database. In one or more embodiments, at this point in the ISSU process, the updated state database includes the forwarding information from the ISSU cache, which corresponds to at least a portion of the frozen data path forwarding information currently being used by the line cards of the standalone network device to process network traffic.

In Step 214, the method includes deleting the ISSU cache. As an example, either the ISSU orchestrator, or the IDPO at the direction of the ISSU orchestrator, may delete the ISSU cache. In one or more embodiments, deleting or otherwise stopping, removing, etc. the ISSU cache frees the resources used to maintain the ISSU cache, and such resources may be used, if needed, for the remainder of the ISSU process.

In one or more embodiments, after Step 214, the ISSU process continues, as shown in FIG. 3 and discussed below.

FIG. 3 illustrates an overview of an example method for performing an in-service software update on a standalone network device in accordance with one or more embodiments disclosed herein. All or any portion of the method shown in FIG. 2 may be performed, for example, by a network device (e.g., the network device 100 shown in FIG. 1), and/or any components therein (e.g., the ISSU orchestrator 102, the IDPO 104, and/or the software updater 108 shown in FIG. 1). Additionally, or alternatively, all or any portion of the method shown in FIG. 2 may be performed, for example, by a computing device (e.g., the computing device 400 shown in FIG. 4) configured, at least in part, to serve as a network device by processing network traffic.

While the various steps in the flowchart shown in FIG. 3 are presented and described sequentially, some or all of the steps may be executed in different orders, some or all of the steps may be combined or omitted, other steps not shown in FIG. 2 may additionally be performed, and/or some or all of the steps may be executed in parallel with other steps of FIG. 2 and/or FIG. 3.

In Step 300, the method includes generating a warm boot file for one or more line cards of a standalone network device. As an example, an ISSU orchestrator (e.g., the ISSU orchestrator 102 of FIG. 1) may cause an IDPO (e.g., the IDPO 104 of FIG. 1) to instruct the one or more line card daemons of the standalone network device to create warm boot files by writing their internal state into a warm boot file. In one or more embodiments, a warm boot file is created for each line card daemon of the standalone network device, and includes the internal state of the line card, which may include, but is not limited to, information such as the various features implemented, the existence and location of the various data structures of the line cards, mapping information for how to write data into such data structures (e.g., TCAM index information). In one or more embodiments, a warm boot file is a file for a line card daemon that the line card daemon can use after restarting to recover the internal state of the line card as it existed before the line card daemon was restarted (e.g., after being updated, as discussed herein).

In Step 302, the method includes installing updated line card daemons. As an example, an ISSU orchestrator may request a software updater (e.g., the software updater 108 of FIG. 1) to install updated versions of the line card daemons. In one or more embodiments, installing the updated line card daemons includes obtaining installation files (e.g., binaries) from a software update image for the standalone network device. The software update image may be accessed using any technique for accessing data, such as, for example, over a network from a software repository, from local storage of the standalone network device where the software update image was downloaded, from a removable storage device, etc. In one or more embodiments, the installation files (e.g., binaries) for the updated line card daemons are extracted from the software update image, and installed on the standalone network device.

In Step 304, the method includes starting execution of the updated line card daemons. As an example, the ISSU orchestrator may cause the line card daemons to restart to the updated version of the line card daemons.

In Step 306, the method includes recovering the internal state of the line card daemons using their respective warm boot files generated in Step 300. In one or more embodiments, the warm boot files are provided as input to the updated line card daemons after they are started. In one or more embodiments, using the warm boot files as input, the updated line card daemons are able to recover their internal state as it existed before the update.

In Step 308, the method includes connecting the updated line card daemons to the updated state database that was installed in Step 206 of FIG. 2. As an example, the ISSU orchestrator may cause the updated line card daemons to connect to the updated state database version, which, at this point in the ISSU process, includes the information from the snapshot of the forwarding information of the line cards that was previously stored in the ISSU cache when the data path of the line cards was frozen. Thus, in one or more embodiments, the line card daemons may re-populate their respective data plane information from the updated state database, which should match, or at least not conflict with, the information currently being used by the line cards to process network traffic.

In Step 310, the method includes syncing the updated state database to the non-updated version of the state database. As an example, the ISSU orchestrator may cause the updated version of the state database to be synced to the non-updated version of the state database. In one or more embodiments, at this point in the ISSU process, the non-updated version of the state database still exists and is executing on the standalone network device, and is still being updated by the various daemons still executing on the standalone network device (e.g., control plane daemons) with state updates for the network device. Thus, in one or more embodiments, syncing the updated version of the state database to the non-updated version of the state database causes the updated state database to have the updated state of the network device (at least in part), including updated routing information from the various routing protocol daemons.

In Step 312, the method includes unfreezing the data path of the one or more line cards of the standalone network device by allowing the updated line card daemons to update the forwarding information on the one or more line cards. In one or more embodiments, the updated line card daemons begin performing any updates to the state of the line cards (e.g., forwarding information updates) in response to any relevant changes in the updated state database, which are received via the sync with the non-updated state database, which the existing control plane daemons of the standalone network device have been continuing to update throughout the ISSU process disclosed herein. In one or more embodiments, the line card daemons are able to resume programing the forwarding information to the line cards based, at least in part, on the internal state information of the warm boot file that was used after the restart of each updated line card daemon, and the updated state information in the updated state database.

In Step 314, the method includes updating the control plane daemons of the standalone network device. As an example, an ISSU orchestrator may request a software updater (e.g., the software updater 108 of FIG. 1) to install updated versions of the control plane daemons. In one or more embodiments, installing the updated control plane daemons includes obtaining installation files (e.g., binaries) from a software update image for the standalone network device. The software update image may be accessed using any technique for accessing data, such as, for example, over a network from a software repository, from local storage of the standalone network device where the software update image was downloaded, from a removable storage device, etc. In one or more embodiments, the installation files (e.g., binaries) for the updated control plane daemons are extracted from the software update image, and installed on the standalone network device. In one or more embodiments, the control plane daemons are the daemons that are more important for the standalone network device to continue to correctly process network traffic. In one or more embodiments, the more critical daemons updated at Step 314 may include, but are not limited to: routing protocol daemons, such as daemons for BGP, OSPF, IS-IS, RIP; and other daemons for various features that may be implemented on a network device, such as STP, VRRP, BFD, VXLAN, LAG, MPLS, GRE, VPN, etc. Other control plane daemons may be updated at Step 314 without departing from the scope of embodiments disclosed herein.

In one or more embodiments, once the new versions of the control plane daemons are installed, the daemons are restarted and connected to the updated version of the state database. Thus, at this point in the ISSU process, the control plane daemons are directly updating the updated version of the database when state changes (e.g., route updates) occur. In one or more embodiments, the update of the control plane daemons occurs in an amount of time in the sub-second range, thereby rendering the update relatively hitless with respect to the control plane of the network device.

In Step 316, the method includes updating the platform plane daemons of the standalone network device. As an example, the ISSU orchestrator may request the software updater to update the remaining daemons of the network device, such as the platform daemons (e.g., daemons controlling or otherwise managing fans, Bluetooth, USB, temperature components, helper components, counter components, port-state, etc.). In one or more embodiments, as each daemon is updated and restarted, the updated version of the daemon is connected to the new version of the database.

In one or more embodiments, once the state database and all or any portion of the daemons of the network device are updated, as described above, the non-updated version of the state database is stopped, and may be discarded. In one or more embodiments, at this point in the ISSU process, the state database and some or all of the daemons of the standalone network device, including the control plane daemons, have been updated, without impacting the data plane and forwarding operation of the network device during the ISSU process.

Figure 4:
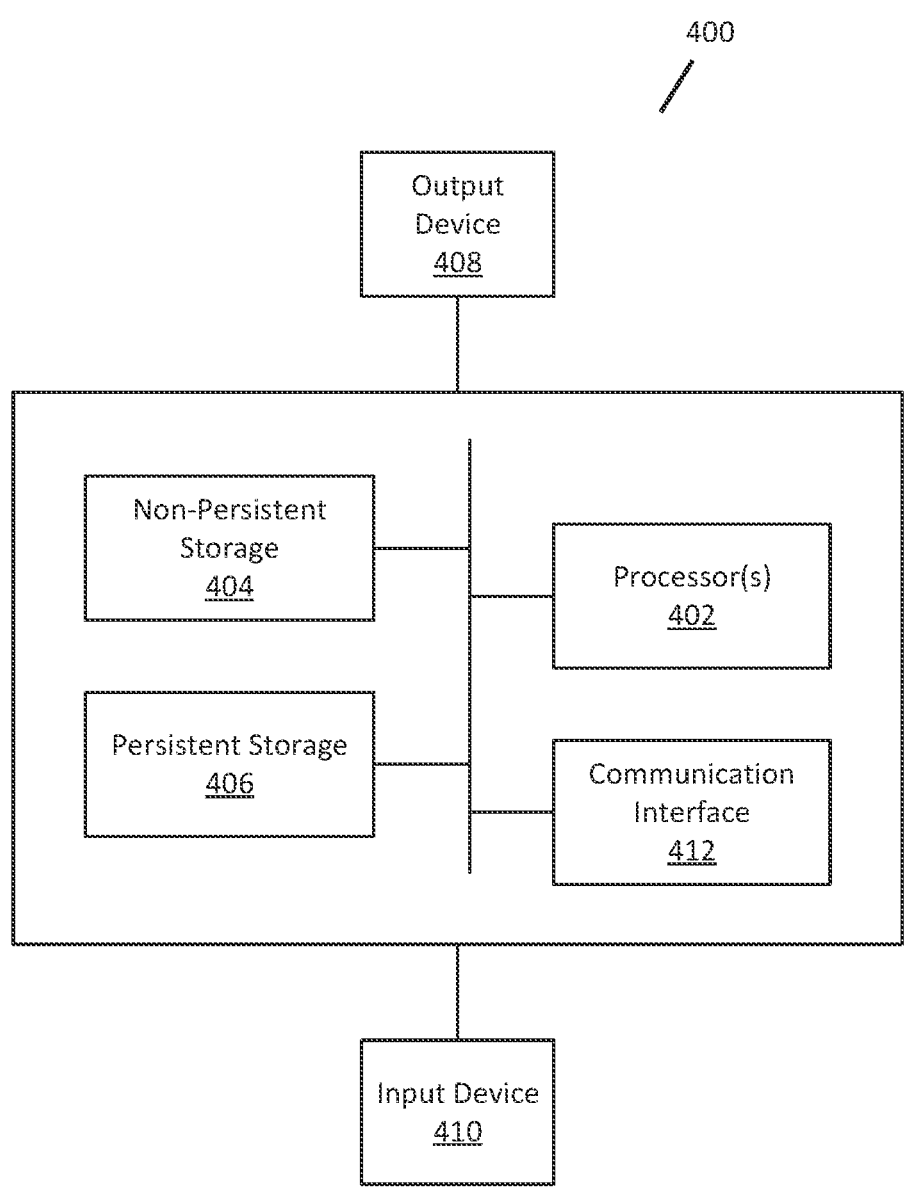
FIG. 4 illustrates a block diagram of a computing device, in accordance with one or more embodiments of this disclosure.

FIG. 4 illustrates a block diagram of a computing device, in accordance with one or more embodiments of this disclosure. As discussed above, embodiments described herein may be implemented using computing devices. For example, the all or any portion of the components shown in FIG. 1 may be implemented, at least in part, using one or more computing devices. The computing device 400 may include one or more computer processors 402, non-persistent storage 404 (e.g., volatile memory, such as random access memory (RAM), cache memory, etc.), persistent storage 406 (e.g., a hard disk, an optical drive such as a compact disk (CD) drive or digital versatile disk (DVD) drive, a flash memory, etc.), a communication interface 412 (e.g., Bluetooth interface, infrared interface, network interface, optical interface, etc.), input devices 410, output devices 408, and numerous other elements (not shown) and functionalities. Each of these components is described below.

In one or more embodiments, the computer processor(s) 402 may be an integrated circuit for processing instructions. For example, the computer processor(s) may be one or more cores or micro-cores of a processor. The processor 402 may be a general-purpose processor configured to execute program code included in software executing on the computing device 400. The processor 402 may be a special purpose processor where certain instructions are incorporated into the processor design. Although only one processor 402 is shown in FIG. 3, the computing device 400 may include any number of processors without departing from the scope of embodiments disclosed herein.

The computing device 400 may also include one or more input devices 410, such as a touchscreen, keyboard, mouse, microphone, touchpad, electronic pen, motion sensor, or any other type of input device. The input devices 410 may allow a user to interact with the computing device 400. In one or more embodiments, the computing device 400 may include one or more output devices 408, such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) 402, non-persistent storage 404, and persistent storage 406. Many different types of computing devices exist, and the aforementioned input and output device(s) may take other forms. In some instances, multimodal systems can allow a user to provide multiple types of input/output to communicate with the computing device 400.

Further, the communication interface 412 may facilitate connecting the computing device 400 to a network (not shown) (e.g., a local area network (LAN), a wide area network (WAN) such as the Internet, mobile network, or any other type of network) and/or to another device, such as another computing device. The communication interface 412 may perform or facilitate receipt and/or transmission of wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a Bluetooth® wireless signal transfer, a BLE wireless signal transfer, an IBEACON® wireless signal transfer, an RFID wireless signal transfer, near-field communications (NFC) wireless signal transfer, dedicated short range communication (DSRC) wireless signal transfer, 802.11 WiFi wireless signal transfer, WLAN signal transfer, Visible Light Communication (VLC), Worldwide Interoperability for Microwave Access (WiMAX), IR communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 412 may also include one or more Global Navigation Satellite System (GNSS) receivers or transceivers that are used to determine a location of the computing device 400 based on receipt of one or more signals from one or more satellites associated with one or more GNSS systems. GNSS systems include, but are not limited to, the US-based GPS, the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

The term computer-readable medium includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as CD or DVD, flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

All or any portion of the components of the computing device 400 may be implemented in circuitry. For example, the components can include and/or can be implemented using electronic circuits or other electronic hardware, which can include one or more programmable electronic circuits (e.g., microprocessors, GPUs, DSPs, CPUs, and/or other suitable electronic circuits), and/or can include and/or be implemented using computer software, firmware, or any combination thereof, to perform the various operations described herein. In some aspects the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

In the above description, numerous details are set forth as examples of embodiments described herein. It will be understood by those skilled in the art (who also have the benefit of this disclosure) that one or more embodiments described herein may be practiced without these specific details, and that numerous variations or modifications may be possible without departing from the scope of the embodiments described herein. Certain details known to those of ordinary skill in the art may be omitted to avoid obscuring the description.

Specific details are provided in the description above to provide a thorough understanding of the aspects and examples provided herein. However, it will be understood by one of ordinary skill in the art that the aspects may be practiced without these specific details. For clarity of explanation, in some instances the present technology may be presented as including functional blocks that may include devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but may have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

In the above description of the figures, any component described with regard to a figure, in various embodiments described herein, may be equivalent to one or more same or similarly named and/or numbered components described with regard to any other figure. For brevity, descriptions of these components may not be repeated with regard to each figure. Thus, each and every embodiment of the components of each figure is incorporated by reference and assumed to be optionally present within every other figure having one or more same or similarly named and/or numbered components. Additionally, in accordance with various embodiments described herein, any description of the components of a figure is to be interpreted as an optional embodiment, which may be implemented in addition to, in conjunction with, or in place of the embodiments described with regard to a corresponding one or more same or similarly named and/or numbered component in any other figure.

Throughout the application, ordinal numbers (e.g., first, second, third, etc.) may be used as an adjective for an element (i.e., any noun in the application). The use of ordinal numbers is not to imply or create any particular ordering of the elements, nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

While embodiments discussed herein have been described with respect to a limited number of embodiments, those skilled in the art, having the benefit of this disclosure, will appreciate that other embodiments can be devised which do not depart from the scope of embodiments as disclosed herein. Accordingly, the scope of embodiments described herein should be limited only by the attached claims.

What is claimed is:
1. A standalone network device, comprising:
one or more processors; and
one or more non-transitory computer readable media storing instructions which, when executed by the one or more processors, cause the one or more processors to:
stop a plurality of platform daemons of the standalone network device;
create, after stopping the platform daemons, an in-service software update (ISSU) cache on the standalone network device;
store forwarding information from a line card of the standalone network device in the ISSU cache to freeze the forwarding information;
install an updated state database on the standalone network device;
store the forwarding information from the ISSU cache in the updated state database;
generate a warm boot file for a line card daemon corresponding to the line card;
install an updated line card daemon;
recover an internal state of the line card to the updated line card daemon using the warm boot file;
connect the updated line card daemon to the updated state database;
sync the updated state database to a non-updated state database of the standalone network device;
unfreeze the forwarding information by allowing the updated line card daemon to update the forwarding information of the line card using information from the updated state database;

update a plurality of control plane daemons of the standalone network device; and update the plurality of platform daemons of the standalone network device.

2. The standalone network device of claim 1, wherein execution of the instructions further causes the one or more processors, after storing the forwarding information from the ISSU cache in the updated state database, to delete the ISSU cache.

3. The standalone network device of claim 1, wherein execution of the instructions further causes the one or more processors, before creating the ISSU cache, to execute a memory recovery function on the standalone network device to make additional memory resources available on the standalone network device.

4. The standalone network device of claim 1, wherein execution of the instructions further causes the one or more processors to:

connect the updated plurality of control plane daemons to the updated state database; and connect the updated plurality of platform daemons to the updated state database.

5. The standalone network device of claim 1, wherein the warm boot file comprises the internal state of the line card.

6. The standalone network device of claim 1, wherein the plurality of control plane daemons comprise a plurality of routing protocol daemons configured to maintain a Routing Information Base (RIB) of the standalone network device.

7. The standalone network device of claim 1, wherein execution of the instructions further causes the one or more processors to discard the non-updated state database after updating the plurality of control plane daemons and updating the plurality of platform daemons.

8. A method, comprising:

stopping, by an in-service software update (ISSU) orchestrator of a standalone network device, a plurality of platform daemons of the standalone network device;

creating, after stopping the plurality of platform daemons, an ISSU cache on the standalone network device;

storing forwarding information from a line card of the standalone network device in the ISSU cache to freeze the forwarding information;

installing an updated state database on the standalone network device;

storing the forwarding information from the ISSU cache in the updated state database;

generating a warm boot file for a line card daemon corresponding to the line card;

installing an updated line card daemon;

recovering an internal state of the line card to the updated line card daemon using the warm boot file;

connecting the updated line card daemon to the updated state database;

syncing the updated state database to a non-updated state database of the standalone network device;

unfreezing the forwarding information by allowing the updated line card daemon to update the forwarding information of the line card using information from the updated state database;

updating a plurality of control plane daemons of the standalone network device; and updating the plurality of platform daemons of the standalone network device.

9. The method of claim 8, further comprising, after storing the forwarding information from the ISSU cache in the updated state database, deleting the ISSU cache.

10. The method of claim 8, further comprising, before creating the ISSU cache, executing a memory recovery function on the standalone network device to make additional memory resources available on the standalone network device.

11. The method of claim 8, further comprising:

connecting the updated plurality of control plane daemons to the updated state database; and connecting the updated plurality of platform daemons to the updated state database.

12. The method of claim 8, wherein the warm boot file comprises the internal state of the line card.

13. The method of claim 8, wherein the plurality of control plane daemons comprise a plurality of routing protocol daemons configured to maintain a Routing Information Base (RIB) of the standalone network device.

14. The method of claim 8, further comprising discarding the non-updated state database after updating the plurality of control plane daemons and updating the plurality of platform daemons.

15. A non-transitory computer-readable medium storing programming for execution by one or more processors, the programming comprising instructions to:

stop a plurality of platform daemons of a standalone network device;

create, after stopping the platform daemons, an in-service software update (ISSU) cache on the standalone network device;

store forwarding information from a line card of the standalone network device in the ISSU cache to freeze the forwarding information;

install an updated state database on the standalone network device;

store the forwarding information from the ISSU cache in the updated state database;

generate a warm boot file for a line card daemon corresponding to the line card;

install an updated line card daemon;

recover an internal state of the line card to the updated line card daemon using the warm boot file;

connect the updated line card daemon to the updated state database;

sync the updated state database to a non-updated state database of the standalone network device;

unfreeze the forwarding information by allowing the updated line card daemon to update the forwarding information of the line card using information from the updated state database;

update a plurality of control plane daemons of the standalone network device; and update the plurality of platform daemons of the standalone network device.

16. The non-transitory computer-readable medium of claim 15, comprising further instructions that, when executed by the one or more processors, cause the one or more processors to, after storing the forwarding information from the ISSU cache in the updated state database, delete the ISSU cache.

17. The non-transitory computer-readable medium of claim 15, comprising further instructions that, when executed by the one or more processors, cause the one or more processors to, before creating the ISSU cache, to execute a memory recovery function on the standalone network device to make additional memory resources available on the standalone network device.

18. The non-transitory computer-readable medium of claim 15, comprising further instructions that, when executed by the one or more processors, cause the one or more processors to:

connect the updated plurality of control plane daemons to the updated state database; and connect the updated plurality of platform daemons to the updated state database.

19. The non-transitory computer-readable medium of claim 15, wherein the plurality of control plane daemons comprise a plurality of routing protocol daemons configured to maintain a Routing Information Base (RIB) of the stand-alone network device.

20. The non-transitory computer-readable medium of claim 15, comprising further instructions that, when executed by the one or more processors, cause the one or more processors to discard the non-updated state database after updating the plurality of control plane daemons and updating the plurality of platform daemons.

\* \* \* \* \*